United States Patent [19]

Imai

[11] Patent Number: 5,254,515
[45] Date of Patent: Oct. 19, 1993

[54] CATALYST FOR DECOMPOSING NITROGEN OXIDES AND A METHOD OF PURIFYING A WASTE GAS CONTAINING NITROGEN OXIDES

[75] Inventor: Tetsuya Imai, Hiroshima, Japan

[73] Assignee: Mitsubishi Jukogyo Kabushiki Kaisha, Tokyo, Japan

[21] Appl. No.: 721,659

[22] PCT Filed: Oct. 30, 1990

[86] PCT No.: PCT/JP90/01394
§ 371 Date: Jul. 19, 1991
§ 102(e) Date: Jul. 19, 1991

[87] PCT Pub. No.: WO91/06508
PCT Pub. Date: May 16, 1991

[30] Foreign Application Priority Data

Nov. 24, 1989 [JP] Japan .................................. 1-303194
Oct. 31, 1990 [JP] Japan .................................. 1-281996

[51] Int. Cl.$^5$ .............................................. B01J 29/06
[52] U.S. Cl. .................................. 502/64; 423/329.1; 423/239.2
[58] Field of Search ................... 502/64, 179; 423/328, 423/329.1, 239

[56] References Cited

U.S. PATENT DOCUMENTS

| | | | |
|---|---|---|---|
| 4,735,927 | 4/1988 | Gerdes et al. | 502/64 |
| 4,845,063 | 7/1989 | Chu | 502/64 |
| 5,059,567 | 10/1991 | Linsten et al. | 502/79 |
| 5,098,687 | 3/1992 | Skeels et al. | 423/328 |

*Primary Examiner*—Anthony McFarlane
*Attorney, Agent, or Firm*—Wenderoth, Lind & Ponack

[57] ABSTRACT

The present invention relates to a catalytic composition effective for removing harmful materials such as NOx, CO, HC, etc. causing photochemical smog, contained in a combustion waste gas exhausted from industrial plants, cars, etc. and has been developed based on finding that the crystalline silicate having the specified composition and crystalline structure and having been subjected to ion-exchange with copper has not only a very high activity as a catalyst of catalytically decomposing NO, but also a high selectivity for the conversion of NO into $N_2$ and exhibits a stable activity even in the presence of oxygen and SOx, and when using this catalyst, NOx, CO and HC are decreased near the theoretical air fuel ratio and in a range of higher than the theoretical air fuel ratio, i.e. in the presence of oxygen.

The catalyst consisting of the crystalline silicate in which copper is incorporated according to the present invention can effectively be used as a catalyst for decomposing NOx in a waste gas into $N_2$ and $O_2$, and in particular, NOx, CO and HC contained in a waste gas can effectively be decreased by the use of the catalyst.

3 Claims, 2 Drawing Sheets

CATALYST FOR DECOMPOSING NITROGEN OXIDES AND A METHOD OF PURIFYING A WASTE GAS CONTAINING NITROGEN OXIDES

TECHNICAL FIELD

The present invention relates to a catalyst for the removal of nitrogen oxides (which will hereinafter be referred to as "NOx") from a waste gas containing NOx, in particular, a catalyst for directly decomposing NOx, and to a method of purifying a gas containing NOx, in particular, a gas containing NOx, CO and hydrocarbons (which will hereinafter be referred to as "HC").

TECHNICAL BACKGROUND

Since NOx in a combustion waste gas exhausted from industrial plants, cars, etc. is a material causing photochemical smog, development of a method of removing it is an important and urgent social problem from the standpoint of protecting the environment. It is particularly difficult to remove NO of NOx gases and various methods have been proposed to solve this problem up to the present time. For example, a catalytic reduction method has been proposed and developed, as an effective means, but this method needs a reducing agent such as ammonia, hydrogen, carbon monoxide, etc. and a special apparatus for recovering or decomposing the unreacted reducing agent. On the other hand, a catalytic decomposition method is a method comprising only passing a waste gas through a catalyst bed to decompose NOx into nitrogen and oxygen without need of a special additive. This method is very simple and accordingly, it is most preferable. According to the former studies, it is found that Pt, CuO and $Co_3O_4$ have NO decomposing activity, but they tend to be subject to poisoning with oxygen as a decomposition product and cannot be a practical catalyst [Toshio Uchijima, "Hyomen (Surface)" Vol. 18, No. 3 (1980), page 132].

Furthermore, harmful materials such as NOx, CO, HC, etc. which are considered to cause photochemical smog are contained in combustion waste gases exhausted from gasoline engines of cars, diesel engines of buses, tracks, etc. and it is an important and urgent social problem to develop a method of removing them from the standpoint of protecting the environment.

For the removal of NOx in a waste gas, there are adsorption methods, oxidation and absorption methods, catalytic reduction methods and the like, but the catalytic reduction methods have been considered advantageous from the economical and technical point of view because of no need of after-treatments. This catalytic reduction method is a method comprising passing a waste gas through a catalyst bed in the presence of a reducing gas and thereby converting NOx into unharmful nitrogen, which is classified into two methods depending on the variety of the reducing agents.

That is, these methods are the so-called non-selective reduction method wherein reduction of a waste gas is carried out by adding a reducing gas such as hydrogen, carbon monoxide, hydrocarbons, etc. and contacting with a catalyst and the so-called selective reduction method wherein the reduction is carried out by adding a reducing gas such as ammonia, etc. and contacting with a catalyst. The former method has the disadvantage that the reducing agent is reacted with oxygen jointly present in the gas and then the removal reaction of NOx proceeds, resulting in need of the reducing agent in a large amount, but in a case where a waste gas such as exhausted from internal combustion engines of cars previously contains a reducing agent such as carbon monoxide, hydrocarbons, etc. in an amount of at least equimolar to oxygen, the non-selective reduction method is more advantageous for removing NOx in the waste gas. As a catalyst for the removal of NOx in waste gases from cars, it is preferable to use one for the non-selective reduction reaction.

When no catalyst is used, a waste gas from a car has a gas composition as shown in FIG. 1, and when a three way catalyst capable of simultaneously removing NOx, CO and HC is used, the gas composition is as shown in FIG. 2, and the three components of NOx, CO and HC are removed approximately at the theoretical fuel ratio. The engine combustion waste gas at the theoretical air fuel ratio has the following composition:

CO: 0.3~1%; NO: 0.05~0.15%; $H_2O$: about 13%
$H_2$: 0.1~0.3%; HC: 0.03~0.08%; $SO_2$: about 0.002%
$O_2$: 0.2~0.5%; $CO_2$: about 12%.

The chemical reactions, in which NOx, CO and HC participate in the above described waste gas, are as follows:

HC includes a wide range of $C_1$ to $C_7$, i.e. methane ($CH_4$) to toluene ($C_7H_8$), and accordingly, in the following reaction schemes, HC is represented by ethylene ($C_2H_4$).

$$CO + 1/2 O_2 \rightarrow CO_2 \qquad (1)$$

$$C_2H_4 + 3O_2 \rightarrow 2CO_2 + 2H_2O \qquad (2)$$

$$2NO + 2CO \rightarrow 2CO_2 + N_2 \qquad (3)$$

$$6NO + C_2H_4 \rightarrow 2CO_2 + 2H_2O + 3N_2 \qquad (4)$$

$$2NO + 2H_2 \rightarrow 2H_2O + N_2 \qquad (5)$$

$$CO + H_2O \rightarrow CO_2 + H_2 \qquad (6)$$

$$2NO \rightarrow N_2 + O_2 \qquad (7).$$

It has been proposed to subject silica gel or zeolite to ion-exchange with Cu as a substitute of the above described catalyst, but the resulting catalysts have the following problem:

(1) The catalyst obtained by supporting copper ion on silica gel by an ion exchange method has a considerably high initial activity, but the activity is rapidly lowered with the passage of time.

(2) The catalyst obtained by subjecting a Y-type zeolite or mordenite to ion-exchange with copper has a low decomposition activity in the presence of oxygen.

(3) The catalyst obtained by subjecting a ZSM-5 type zeolite to ion-exchange with copper has a problem that the decomposition activity of NO is high, but the selectivity in the conversion of NO into $N_2$ ($2NO \rightarrow N_2 + O_2$) is low (Japanese Patent Laid-Open Publication No. 125250/1985).

When using the three way catalyst having been put to practical use for the purpose of purifying a waste gas from a car engine, oxygen is consumed by the oxidation reactions of the above described reactions (1) and (2) and the reduction reactions of NO of the above described reactions (3) to (5) proceed under such a state that the oxygen concentration is considerably lowered. Therefore, the three way catalyst is effective only near the theoretical air fuel ratio (14.6) and it is difficult to reduce NOx in a high air fuel ratio zone in which the rate of fuel consumption can be decreased ["Shokubai (Catalyst)" Vol. 29, No. 7, 1987, p 598-609].

Since the air fuel ratio of a diesel engine is in the range of 20 to 80 and the oxygen concentration is high, on the other hand, removal of NOx by a catalyst is difficult at the present time ["Shokubai Koza (Catalyst Lecture)" 7, Kihon Kogyo Hanno (Fundamental Commercial Reactions) by Shokubai Gakkai, published by Kodansha KK].

An example of the composition of a waste gas from a diesel engine is as follows:

CO: 0.02~0.1%; NO: 0.02~0.1%; HC: 0.02~0.1%; $O_2$: 5~15%.

The inventors have made various efforts to solve the above described problems of the prior art and consequently, have found that the crystalline silicate having the specified composition and crystalline structure and having been subjected to ion-exchange with copper has not only a very high activity as a catalyst of catalytically decomposing NO, but also a high selectivity for the conversion of NO into $N_2$ and exhibits a stable activity even in the presence of oxygen and SOx, and when using this catalyst, NOx, CO and HC are decreased near the theoretical air fuel ratio and in a range of higher than the theoretical air fuel ratio, i.e. in the presence of oxygen, that is to say, the above described reactions (1) to (7) take place. The present invention is based on this finding.

DISCLOSURE OF THE INVENTION

Accordingly, the present invention provides a catalyst for decomposing nitrogen oxides, comprising a crystalline silicate having a chemical composition represented by the general formula in the terms of mole ratios of oxides under dehydrated state,

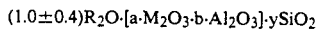

$(1.0\pm0.4)R_2O\cdot[a\cdot M_2O_3\cdot b\cdot Al_2O_3]\cdot ySiO_2$ in which R is at least one of alkali metal ions and hydrogen ion, M is an ion of at least one element selected from the group consisting of Group VIII elements, titanium, chromium, niobium and antimony, $a+b=1$, $a>0$, $b>0$ and $y>12$, the silicate containing copper. In particular, cases where M is iron and chromium or iron and cobalt, in combination, are preferable.

Furthermore, the present invention provides a method of purifying a waste gas containing nitrogen oxides, carbon monoxide and hydrocarbons, comprising contacting the waste gas at a temperature of 300° to 800° C. a catalyst comprising a crystalline silicate having a chemical composition represented by the general formula in the terms of mole ratios of oxides under dehydrated state,

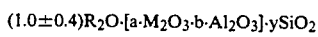

$(1.0\pm0.4)R_2O\cdot[a\cdot M_2O_3\cdot b\cdot Al_2O_3]\cdot ySiO_2$ in which R is at least one of alkali metal ions and hydrogen ion, M is an ion of at least one element selected from the group consisting of Group VIII elements, titanium, chromium, niobium and antimony, $a+b=1$, $a>0$, $b>0$ and $y>12$, the silicate containing copper. In particular, cases where M is iron and chromium or iron and cobalt, in combination, are preferable.

BEST EMBODIMENT FOR PRACTICING THE INVENTION

Figure 1:
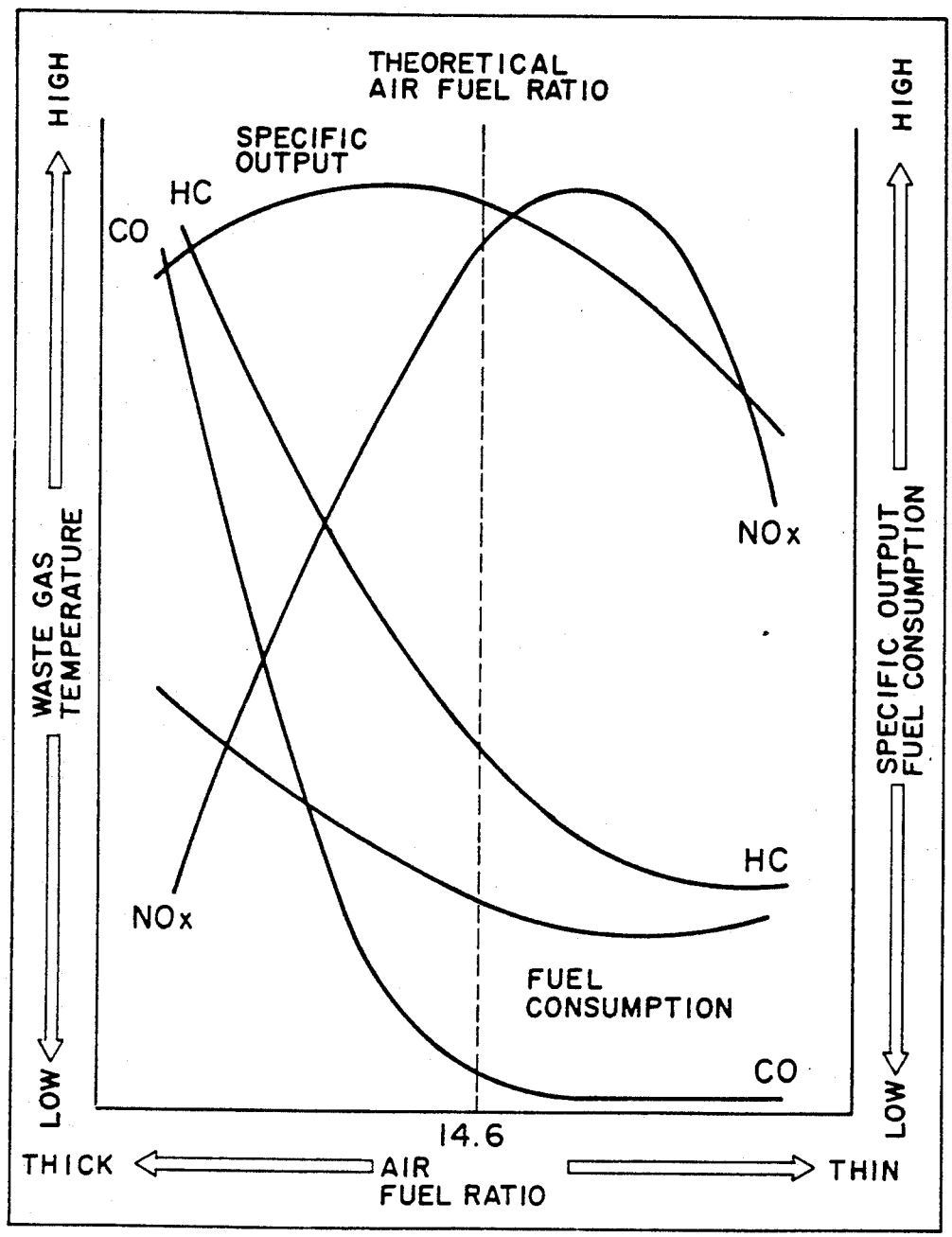
FIG. 1 a graph showing a composition of a waste gas from a car (no catalyst) and FIG. 2 is a graph showing a composition of a waste gas in the case of using a three way catalyst.
Figure 2:
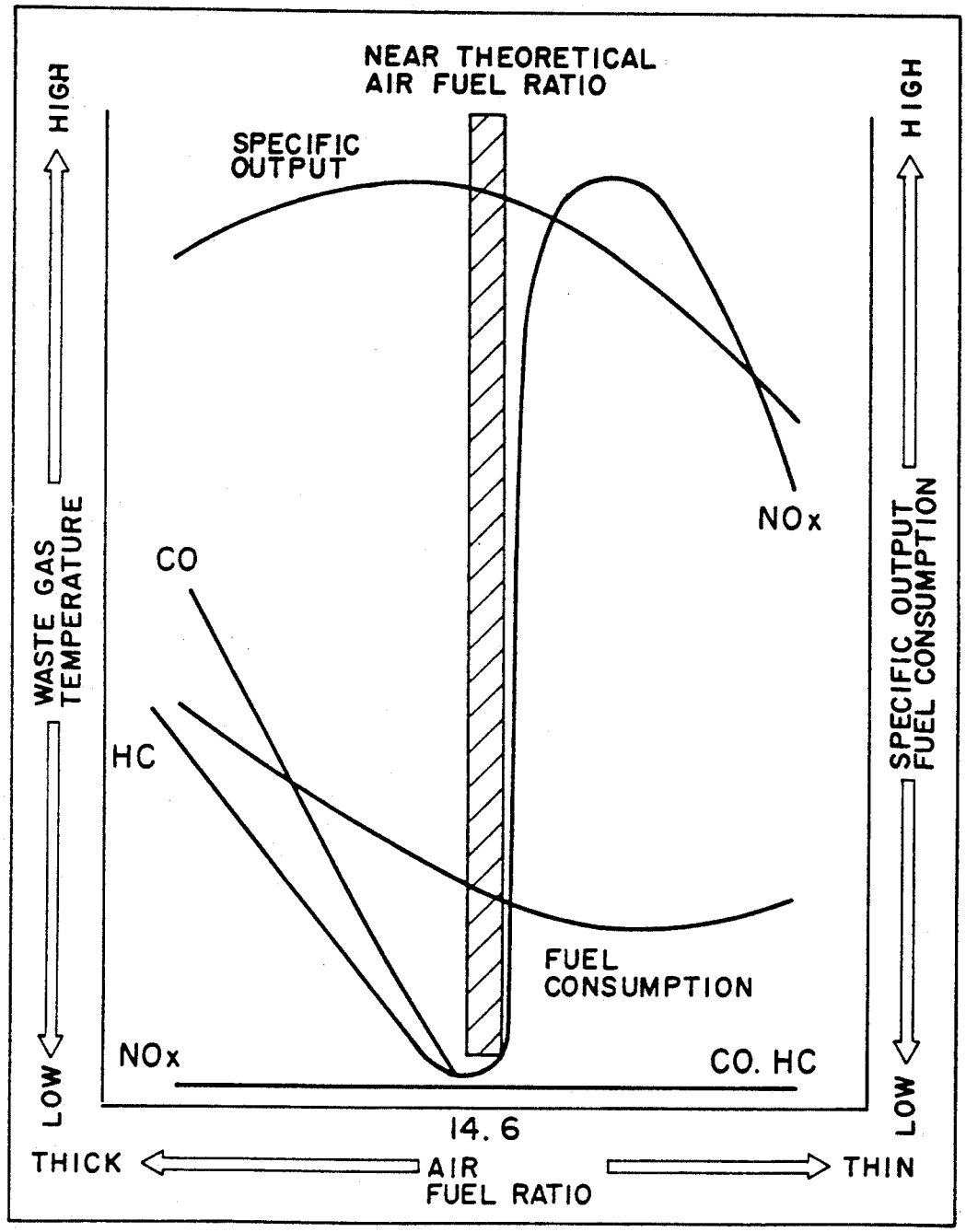

The catalyst of the present invention has a very high activity in the decomposition of NO, which can be maintained for a long time. As to the action of the catalyst of the present invention, the oxidation and reduction cycle of copper ion-exchanged ($Cu^{2+}\rightleftarrows Cu^+$) can readily be carried out, which is probably due to that a mechanism of releasing oxygen at a relatively low temperature is combined with the peculiar crystalline structure of the catalyst of the present invention, the structure stability and the heat resistance.

The catalyst used in the present invention has the feature that on $Cu^+$, CO tends to be activated and NO tends to be decomposed, and on the crystalline silicate, HC tends to be activated.

The catalyst of the invention and a method of purifying a waste gas using the same will now be illustrated in detail:

Zeolite is a crystalline aluminosilicate containing zeolitic water, as shown by an etymology of Greek "boiling water", and its composition is generally represented by the following general formula:

$xM_{2/n}O\cdot Al_2O_3\cdot ySiO_2\cdot zH_2O$ in which n is the atomic valence of a cation M, x is a numeral in the range of 0.8~2, y is a numeral of at least 2 and z is a numeral of at least 0.

The fundamental structure of the aluminosilicate is such that $SiO_4$ tetrahedrons having 4 oxygens coordinated at the peaks round the silicon and $AlO_4$ tetrahedrons having aluminum positioned at the center instead of the silicon are regularly and three-dimensionally combined with owning jointly the oxygen atoms in such a manner that the $O/(Al+Si)$ atomic ratio is 2. As a result, a three-dimensional network structure having pores differing in size and shape is formed depending upon the combining system of these tetrahedrons with each other. The negative charge of the $AlO_4$ tetrahedron is electrically neutralized by combining with cations such as alkali metal or alkaline earth metal ions. In general, the thus formed pores have a size of 2~3 Å to 10 and several Å, but can be varied by exchanging the metallic cation bonded to the $AlO_4$ tetrahedrons with another metallic ion differing in size and atomic valence.

Zeolites have widely been used, utilizing the pores thereof, as drying agents of gases or liquids on commercial scale, molecular sieves for adsorbing and separating molecules in a mixture of two or more molecules from each other or industrial catalysts utilizing the property thereof that those in which the metal ion is exchanged with hydrogen ion functions as a solid acid.

Zeolites have a number of varieties which are respectively named in different names depending upon the crystalline structures characterized by X-ray diffraction patterns. As naturally occurring zeolites, there are chabazite, erionite, mordenite, clinoputyrolite and the like. As the synthetic zeolite, there are A, X, Y, large and port type mordenite, ZSM-5 and the like.

Among these zeolites, what can be used in the present invention are limited to the crystalline silicates each having the specified composition and structure. These crystalline silicates do not naturally occur, but can be synthesized by the following procedures:

The above described crystalline silicate used in the present invention can be synthesized by preparing a reaction mixture containing a silica source, an oxide source such as of Group VIII elements, rare earth elements, titanium, vanadium, chromium, niobium and antimony, an alumina source, an alkali source, water and an organic nitrogen-containing compounds and then heating the mixture for a time and at a temperature sufficient to form the crystalline silicate.

As the silica source, there can be used any silica compounds commonly used in the synthesis of zeolites, for example, solid silica powders, colloidal silica and silicates such as water glass.

The sources of Group VIII elements, titanium, chromium, niobium and antimony can be used in the form of compounds such as sulfate, nitrate, chloride, etc. Examples of Group VIII elements are iron, cobalt, ruthenium, rhodium, platinum, palladium, etc.

As the alumina source, there can be used compounds such as aluminum chloride, nitrate, sulfate, oxide and hydroxide. Above all, sodium aluminate is most suitable.

As the alkali source, there can be used compounds such as hydroxides, aluminates and silicates of alkali metals such as sodium.

The organic nitrogen-containing compound as one raw material for the hydrothermal synthesis of crystalline silicates include the following materials:

(1) Organic Amines primary amines such as n-propylamine, monoethanolamine, etc. secondary amines such as dipropylamine, diethanolamine, etc. tertiary amines such as tripropylamine, triethanolamine, etc. ethylenediamine, diglycolamine or mixtures of the above described compounds and halogenated hydrocarbons (brominated propyl) quaternary ammonium salts such as tetrapropylammonium salt, etc.

(2) Other Organic Nitrogen-containing Compounds than Organic Amines pyridine, pyrazine, pyrazole, etc.

These various organic compounds are only exemplified without limiting the present invention.

The crystalline silicate of the present invention is characterized in that a part of Al in the structure of a zeolite of the prior art is replaced by a Group VIII element, titanium, chromium, niobium or antimony and the $SiO_2/(M_2O_3+Al_2O_3)$ ratio is 12 or more, and is prepared from a reaction mixture having the following composition:

| | |
|---|---|
| $SiO_2/(M_2O_3 + Al_2O_3)$ | 12~3000 (preferably 20~200) |
| $OH^-/SiO_2$ | 0~1.0 (preferably 0.2~0.8) |
| $H_2O/SiO_2$ | 2~1000 (preferably 10~200) |
| Organic Nitrogen-containing Compound/$(M_2O_3 + Al_2O_3)$ | 0~1000 preferably 5~50 |

The crystalline silicate of the present invention is synthesized by heating the above described mixture of the raw materials at a temperature and for a time sufficient to form the crystalline silicate. That is, the hydrothermal synthesis temperature is generally 80° to 300° C., preferably 130° to 200° C. and the hydrothermal synthesis time is generally 0.5 to 14 days, preferably 1 to 10 days. The pressure is not particularly restricted, but the hydrothermal synthesis is preferably carried out at an autogeneous pressure.

The hydrothermal synthetic reaction is carried out by heating a mixture of raw materials at a desired temperature and continuing, while stirring if necessary, until the crystalline silicate is formed. After the crystal is thus formed, the reaction mixture is cooled to room temperature, filtered, washed with water and the crystal grains are classified, ordinarily followed by drying for about 5 to 24 hours at a temperature of at least 100° C.

The crystalline silicate prepared by the above described procedures is used as a catalyst as it is or after shaping in a suitable size by mixing with a binding agent that has hitherto been used for shaping a catalyst according to the well-known technique.

The crystalline silicate of the present invention is a porous crystalline material having a regular and constant crystalline structure, which has generally X-diffraction patterns as shown in Table 1:

TABLE 1

| Interplanar Spacing (d value) | Relative Intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: very strong
S: strong
M: medium
W: weak

The crystalline silicate obtained by the above described hydrothermal synthesis contains an alkali metal ion such as $Na^+$, an ion of an organic nitrogen-containing compound such as $(C_3H_7)_4N^+$. In order to replace a part or all of these ions with hydrogen ion, there are employed a method comprising calcining the silicate in the air at a temperature of 400° to 700° C. for 2 to 48 hours to remove the organic nitrogen-containing compounds and then immersing in a strong acid such as hydrochloric acid, and a method comprising immersing the silicate in an aqueous solution of an ammonium compound to convert it into the $NH_4$ type and then calcining to convert it into the H type.

The ion-exchange sites such as alkali metal ions and hydrogen ions in the crystalline silicate obtained by the above described method are replaced by copper ions by the following method to obtain the catalyst of the present invention (which will hereinafter be referred to as "the present catalyst" sometimes).

The ion-exchange is carried out by an ordinary method comprising immersing the crystalline silicate in an aqueous solution in which a mineral acid salt such as copper sulfate, copper nitrate, etc. or an organic acid salt such as copper acetate is dissolved. The concentration of copper ion in the aqueous solution can suitably by chosen depending on the aimed exchange ratio of copper ion and the copper ion exchanges a cation in the crystalline silicate in any form of $Cu^+$, $Cu^{2+}$ and $CuOH^+$. The ion-exchanged silicate is then adequately washed with water and dried to obtain the present catalyst. The copper ion exchange ratio of the present catalyst should be at least 10% based on all the exchangeable ions contained in the crystalline silicate as the catalyst substrate and as the NO-decomposing activity is increased with the exchange ratio, this should preferably be present in the range of 40 to 200%. If the exchange ratio is lower than 10%, no effective NO decomposing activity is obtained.

The exchange ratio of copper shows the ratio of copper ion in the ion-exchange sites, which is calculated assuming that two $Na^+$ atoms are ion-exchanged by one $Cu^{2+}$ atom. Thus, an exchange ratio of 200% shows such a state that all the ion-exchange sites are ion-exchanged with copper, i.e. Cu is ion-exchanged under the state of one Cu atom.

The NO decomposing catalyst of the present invention can be used at a wider temperature range, i.e. at 300° to 1000° C., preferably 400° to 700° C., as compared with that of the prior art.

When using the present catalyst on a commercial scale, it is preferably shaped in a suitable form, for example, a spherical form, columnar form, honeycomb form by the use of an inorganic oxide such as silica or alumina, as a binder, optionally using an organic shaping aid. The crystalline silicate before the ion-exchange with copper can be previously shaped and the shaped body is then exchanged with copper ion to obtain a catalyst, which can be regarded as the catalyst of the present invention. The size of the shaped body is not particularly limited.

When a gas containing NOx, CO and HC is purified by the use of the catalyst of the present invention, the catalyst of the present invention is preferably shaped in a monolithic body, or is preferably used after coating a monolithic support with the present catalyst.

EXAMPLES

EXAMPLE 1

A crystalline silicate was synthesized by the following procedure:

Water glass, ferric sulfate, aluminum sulfate and water were mixed to give the following mole ratio:

$$36Na_2O \cdot (0.1Fe_2O_3 \cdot 0.9Al_2O_3) \cdot 80SiO_2 \cdot 1600H_2O$$

The thus resulting mixture was mixed with a suitable amount of sulfuric acid to adjust the pH to about 9, adequately mixed with propylamine and propyl bromide, as an organic nitrogen-containing compound, in a proportion of 20 times as much as the sum of the moles of $Fe_2O_3$ and $Al_2O_3$ and then charged in a stainless autoclave of 500 cc.

The above described mixture was reacted at 160° C. for 3 hours while stirring at about 500 rpm. After cooling, the reaction mixture was subjected to filtration to separate a solid content, adequately washed with water until the pH of the washing water be about 8, dried at 110° C. for 12 hours and calcined at 550° C. for 3 hours.

This product had a crystalline grain diameter of about 1 μm and a compotion in the terms of moles of oxides under dehydrated state:

$(H,Na)_2O \cdot (0.1Fe_2O_3 \cdot 0.9Al_2O_3) \cdot 80SiO_2$

This is named Crystalline Silicate 1.

When Crystalline Silicate 1 was synthesized, a similar silicate could be obtained by using, of the raw materials, hydrochloric acid instead of the sulfuric acid, ferric chloride instead of the ferric sulfate, and silica sol instead of the water glass.

Furthermore, a similar silicate was obtained even when the hydrothermal synthesis reaction was carried out at 170° C. or 180° C. for 2 days instead of reacting at 160° C. for 3 days.

The procedure of preparing Crystalline Silicate 1 was repeated except changing the amounts of ferric sufate and aluminum sulfate used in the preparation of the raw materials of Crystalline Silicate 1 into those tabulated below in terms of the mole ratio of $Fe_2O_3$ and $Al_2O_3$, thus preparing Crystalline Silicates 2 to 4:

| Crystalline Silicate No. | Mole Ratio During Mixing | |
|---|---|---|
| | $Fe_2O_3$ | $Al_2O_3$ |
| 2 | 0.2 | 0.8 |
| 3 | 0.5 | 0.5 |
| 4 | 0.9 | 0.1 |

The procedure of preparing Crystalline Silicate 1 was repeated except using hydrochloric acid instead of the sulfuric acid, and cobalt chloride, ruthenium chloride, rhodium chloride, titanium chloride, chromium chloride or antimony chloride respectively in an amount of the same mole as $Fe_2O_3$ in terms of the oxide instead of the ferric sulfate, thus preparing Crystalline Silicates 5 to 10. These crystalline silicates had compositions exclusive of the organic nitrogen-containing compounds, represented by the following formula in the terms of mole ratios of oxides under dehydrated state:

$(H,Na)_2O \cdot (0.1M_2O_3 \cdot 0.9Al_2O_3) \cdot 80SiO_2$ wherein M represents Ca, Ru, Rh, Ti, Cr or Sb in the order of Crystalline Silicates 5 to 10.

The procedure of preparing Crystalline Silicate 1 was repeated except changing the $SiO_2/(0.1Fe_2O_3+0.9Al_2O_3)$ ratio into 20 and 200 in the preparation of Crystalline Silicate 1, thus obtaining Crystalline Silicates 11 and 12.

It was confirmed that the X-ray diffraction patterns of the powders of Crystalline Silicates 1 to 12 were as shown in Table 1.

10 g of each of Crystalline Silicates 1 to 12 was added to an aqueous solution of 1 g of copper acetate dissolved in 500 cc of water and subjected to ion-exchange by stirring for 12 hours at room temperatrue. This ion-exchange treatment was repeated 3 times, washed with water and dried at 100° C. for 12 hours to prepare Catalysts 1 to 12 corresponding to the number of Crystalline Silicates.

Catalysts 1 to 12 were subjected to sizing in 16 to 32 meshes, 0.5 g of each of the catalysts was packed in a flow reactor of normal pressure fixed bed type, and was then subjected to an activity estimation test under the following conditions. The results are shown in Table 2:

Gas Composition: NO: 0.5%, 0.1%; He: balance.
Gas Flow Rate: 1 Nl/h; Reaction Temperature: 500° C.

TABLE 2

| Catalyst No. | Cu Ion Exchange Ratio (%) | NO Conversion Ratio |
|---|---|---|
| 1 | 120 | 82 |
| 2 | 140 | 85 |
| 3 | 150 | 89 |
| 4 | 140 | 86 |
| 5 | 110 | 80 |
| 6 | 105 | 79 |
| 7 | 105 | 79 |
| 8 | 100 | 78 |

TABLE 2-continued

| Catalyst No. | Cu Ion Exchange Ratio (%) | NO Conversion Ratio |
|---|---|---|
| 9 | 110 | 82 |
| 10 | 110 | 82 |
| 11 | 95 | 77 |
| 12 | 130 | 85 |

It was found that the reacted NO was all converted into $N_2$ and $O_2$ ($2NO \rightarrow N_2 + O_2$), which told a high selectivity.

EXAMPLE 2

0.5 g of Catalyst 1 of Example 1 was packed in a flow reactor of normal pressure fixed bed type and subjected to an activity estimating test by changing the reaction conditions. The results are shown in Table 3.

TABLE 3

| Gas Composition | Gas Flow Rate (Nl/h) | Reaction Temperature (°C.) | NO Conversion Ratio (%) Initial | NO Conversion Ratio (%) After 100 h |
|---|---|---|---|---|
| NO 1%, | 1 | 450 | 86 | 86 |
| He balance | 2 | ↓ | 75 | 75 |
|  | 4 |  | 60 | 60 |
| NO 2000 ppm | 0.5 | 450 | 73 | 72 |
| $O_2$ 1%; $H_2O$ 2% | 0.5 | 500 | 80 | 80 |
| He balance | 0.5 | 550 | 84 | 84 |
| NO 1000 ppm | 1 | 500 | 74 | 72 |
| $SO_2$ 100 ppm |  |  |  |  |
| $O_2$ 2% | 1 | 550 | 79 | 78 |
| He balance |  |  |  |  |

The reacted NO was all converted into $N_2$ and $O_2$.

As described above, the catalyst used in the present invention exhibited a high acvctivity with a decreased change of activity with the passage of time even when using a gas containing $SO_2$.

EXAMPLE 3

The procedure of preparing Crystalline Silicate 1 of Example 1 was repeated except using a mixture of ferric chloride and chromium chloride in place of the ferric sulfate during mixing the raw materials for Crystalline Silicate 1 and mixing to give the following molar ratio:

$$36Na_2O \cdot (0.09Fe_2O_3 \cdot 0.01Cr_2O_3 \cdot 0.9Al_2O_3) \cdot 80SiO_2 \cdot 1600H_2O$$

to obtain Crystalline Silicate 13, which was then subjected to the Cu ion exchange in an analogous manner to Example 1 except repeating the ion-exchange operation 2 times, thus obtaining Catalyst 13 with a Cu ion exchange ratio of 110%. When this catalyst was subjected to an activity estimating test in an analogous manner to Example 1, the NO conversion ratio was 80%.

The procedure of Example 1 was repeated except not adding ferric sulfate during mixing the raw materials for Crystalline Silicate 1 of Example 1, mixing them to give the following molar ratio:

$$36Na_2O \cdot Al_2O_3 \cdot 80SiO_2 \cdot 1600H_2O$$

adding a suitable amount of hydrochloric acid to adjust the pH of the mixture to about 9 and then adding tetrapropylammonium bromide as the organic nitrogen-containing compound in an amount of 20 times as much as that of $Al_2O_3$.

The product was then subjected to ion-exchange with copper (Cu ion-exchange ratio 105%) in an analogous manner to Example 1 and to activity estimating test under the same conditions, thus resulting in that the NO conversion ratio was high, i.e. 74% and the conversion ratio of the reacted NO into $N_2$ was low, i.e. 72% due to more byproduced $NO_2$, etc.

EXAMPLE 4

Catalysts 1 to 12 of Example 1 were subjected to sizing in 16 to 32 meshes, 0.5 g of each of the catalysts was packed in a flow reactor of normal pressure fixed bed type, and was then subjected to an activity estimation test under the following conditions. The results are shown in Table 4:

Gas Composition: NO: 500 ppm; $C_3H_6$: 500 ppm; CO: 0.5%; $O_2$: 2%; He: balance Gas Flow Rate: 2 Nl/h; Reaction Temperature: 500° C.

TABLE 4

| Catalyst No. | Cu Ion-Exchange Ratio (%) | NO Conversion Ratio (%) | $C_3H_6$ Conversion Ratio (%) | CO Cionversion Ratio (%) |
|---|---|---|---|---|
| 1 | 120 | 85 | 95 | 97 |
| 2 | 140 | 87 | 97 | 98 |
| 3 | 150 | 92 | 100 | 100 |
| 4 | 140 | 88 | 99 | 100 |
| 5 | 110 | 81 | 93 | 95 |
| 6 | 105 | 80 | 92 | 94 |
| 7 | 105 | 81 | 92 | 94 |
| 8 | 100 | 80 | 91 | 94 |
| 9 | 110 | 84 | 95 | 96 |
| 10 | 110 | 85 | 94 | 96 |
| 11 | 95 | 81 | 93 | 95 |
| 12 | 130 | 89 | 99 | 99 |

EXAMPLE 5

0.5 g of Catalyst 1 of Example 1 was packed in a flow reactor of normal pressure fixed bed type and subjected to an activity estimating test by changing the reaction conditions. The results are shown in Table 5.

TABLE 5

| Gas Composition | Gas Flow Rate (Nl/h) | Reaction Temp. (°C.) | NO Conversion (%) (1)* | NO Conversion (%) (2)** | HC Conversion (%) (1) | HC Conversion (%) (2) | CO Conversion (%) (1) | CO Conversion (%) (2) |
|---|---|---|---|---|---|---|---|---|
| NO: 1000 ppm | 2 | 400 | 84 | 84 | 93 | 93 | 82 | 82 |
| $C_2H_4$: 1000 ppm | 2 | 500 | 87 | 87 | 96 | 96 | 98 | 98 |
| CO:0.5%; $O_2$:1%, | 2 | 600 | 89 | 89 | 98 | 98 | 100 | 100 |
| $N_2$: balance | 5 | 500 | 82 | 82 | 93 | 93 | 96 | 96 |
|  | 10 | 500 | 79 | 78 | 91 | 91 | 92 | 91 |
| NO: 2000 ppm |  |  |  |  |  |  |  |  |
| $C_3H_6$: 1000 ppm |  |  |  |  |  |  |  |  |
| CO: 1%; $O_2$: 2% | 5 | 500 | 84 | 83 | 95 | 95 | 98 | 97 |
| $CO_2$:10%;$H_2O$:2%; | 20 | 500 | 81 | 80 | 93 | 93 | 94 | 93 |
| $SO_2$: 100 ppm |  |  |  |  |  |  |  |  |
| $N_2$: balance |  |  |  |  |  |  |  |  |

Note
(1)* initial period
(2)** after 100 hours

As described above, the catalyst used in the present invention exhibited a high activity for NO, CO and HC with a decreased change of activity with the passage of time, even when using a gas containing $SO_2$.

EXAMPLE 6

The procedure of preparing Crystalline Silicate 1 was repeated except not adding ferric sulfate nor adding the organic compound during mixing the raw materials and mixing them to give the following molar ratio:

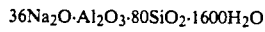

to obtain Crystalline Silicate 14, which was then subjected to Cu ion-exchange in an analogous manner to Example 1, thus obtaining Catalyst 14 with an ion-exchange ratio of 105%.

Using Catalyst 13 of Example 3 and Catalyst 14 of this example, an activity estimating test was carried out in an analogous manner to Example 5 to obtain results shown in Table 6:

TABLE 6

| Catalyst No. | Cu Ion Exchange Ratio (%) | NO Conversion Ratio (%) | $C_3H_6$ Conversion Ratio (%) | CO Conversion Ratio (%) |
|---|---|---|---|---|
| 13 | 110 | 83 | 94 | 96 |
| 14 | 105 | 79 | 91 | 94 |

(for comparison)

EXAMPLE 7

2000 ml of monolithic supports of cordierite with 400 mesh were coated with a slurry of 80 parts of Catalyst 1 and 20 parts of alumina sol and calcined at 500° C. to yield a catalyst supported in an amount of 15% by weight.

Through the above described catalyst was passed a waste gas (NOx concentration: 2000 ppm; whole HC concentration: 1500 ppm; CO concentration: 2000 ppm; temperature of waste gas at inlet of catalyst vessel: 500° C.) from an engine of 1800 cc operated at an air fuel ratio of 18, a revolving number of 2000 rpm and a manifold negative pressure of 400 mmHg, thus resulting in an NOx conversion ratio of 78%, HC conversion ratio of 90% and CO conversion ratio of 92%.

EXAMPLE 8

The procedure of preparing Crystalline Silicate 1 of Example 1 was repeated except using a mixture of ferric chloride and cobalt chloride in place of the ferric sulfate during mixing the raw materials for Crystalline Silicate 1 and mixing them to give the following molar ratio:

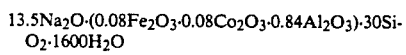

to obtain Crystalline Silicate 15, which was then subjected to the Cu ion exchange in an analogous manner to Example 1 except repeating the ion-exchange operation 2 times, thus obtaining Catalyst 15 with a Cu ion exchange ratio of 120%.

When this catalyst was subjected to an activity estimating test in an analogous manner to Example 1, there were obtained results shown in Table 7:

TABLE 7

| Catalyst No. | Cu Ion-Exchange Ratio (%) | NO Conversion Ratio (%) | $C_3H_6$ Conversion Ratio (%) | CO Conversion Ratio (%) |
|---|---|---|---|---|
| 15 | 120 | 85 | 100 | 98 |

UTILITY AND POSSIBILITY ON COMMERCIAL SCALE

The catalyst consisting of the crystalline silicate in which copper is incorporated according to the present invention can effectively be used as a catalyst for decomposing NOx in a waste gas into $N_2$ and $O_2$.

Furthermore, NOx, CO and HC contained in a waste gas can effectively be decreased by the use of the catalyst consisting of the crystalline silicate in which copper is incorporated according to the present invention.

I claim:

1. A catalyst for decomposing nitrogen oxides, comprising a crystalline silicate having an x-ray diffraction pattern as shown in table 1 and wherein said crystalline silicate has a chemical composition represented by the following formula in the terms of mole ratios of oxides under a dehydrated state, $$(1.0\pm0.4)R_2O\cdot[a\cdot M_2O_3\cdot b\cdot Al_2O_3]\cdot ySiO_2$$

in which R is at least one of alkali metal ions and hydrogen ion, M is an ion of at least one element selected from the group consisting of Group VIII elements, titanium, chromium, niobium and antimony, $a+b=1$, $a>0$, $b>0$ and $y>12$, and wherein at least some of R ions are replaced by copper ions.

2. The catalyst for decomposing nitrogen oxides as claimed in claim 1, wherein M of the above described chemical formula represents iron and chromium.

3. The catalyst for decomposing nitrogen oxides as claimed in claim 1, wherein M of the above described chemical formula represents iron and cobalt.

* * * * *